US008626395B2

(12) United States Patent
Dressler

(10) Patent No.: US 8,626,395 B2
(45) Date of Patent: Jan. 7, 2014

(54) METHOD FOR PROCESSING DATA IN AN INFLUENCING DEVICE

(75) Inventor: Marc Dressler, Horn-Bad Meinberg (DE)

(73) Assignee: dSPACE GmbH, Paderborn (DE)

( * ) Notice: Subject to any disclaimer, the term of this patent is extended or adjusted under 35 U.S.C. 154(b) by 0 days.

(21) Appl. No.: 13/571,143

(22) Filed: Aug. 9, 2012

(65) Prior Publication Data
US 2013/0041551 A1 Feb. 14, 2013

(30) Foreign Application Priority Data
Aug. 9, 2011 (DE) .......................... 10 2011 052 511

(51) Int. Cl.
*B62D 6/00* (2006.01)
(52) U.S. Cl.
USPC ............. 701/42; 701/27; 701/30.2; 701/32.2; 701/32.7; 701/33.3; 701/33.4; 701/102; 701/430; 701/451; 701/452; 701/476; 701/477; 701/478; 701/479; 701/480; 701/540
(58) Field of Classification Search
CPC ............ B62D 6/00; B62D 7/159; H04W 4/04
USPC ........ 701/27, 30.2, 32.2, 32.7, 33.3, 33.4, 42, 701/102, 430, 451–452, 476–480, 540
See application file for complete search history.

(56) References Cited

U.S. PATENT DOCUMENTS

| 8,019,911 | B2 * | 9/2011 | Dressler et al. ................. 710/31 |
| 2005/0102579 | A1 | 5/2005 | Miyayama et al. | |
| 2008/0065239 | A1 * | 3/2008 | Leinfellner et al. ............ 700/34 |
| 2008/0065290 | A1 * | 3/2008 | Breed et al. ..................... 701/29 |
| 2008/0162900 | A1 | 7/2008 | Rolfsmeier et al. | |
| 2008/0195356 | A1 * | 8/2008 | Wenzel et al. ................ 702/189 |
| 2009/0259385 | A1 * | 10/2009 | Loeffler et al. .............. 701/102 |
| 2010/0010705 | A1 * | 1/2010 | Duddle et al. .................. 701/33 |
| 2010/0049395 | A1 * | 2/2010 | Duddle et al. .................. 701/33 |

FOREIGN PATENT DOCUMENTS

| DE | 102 28 610 A1 | 1/2003 |
| DE | 10 2004 027 033 A1 | 10/2005 |
| DE | 10 2005 051 673 A1 | 5/2007 |
| DE | 10 2006 062 555 A1 | 7/2008 |
| WO | WO 02/065220 A1 | 8/2002 |

OTHER PUBLICATIONS

Otterbach et al., "Rapidly Control Prototyping—New Possibilities and Tools," VDI Reports, vol. 1828, pp. 527-538 (Mar. 2, 2004).
Hanselmann, "Automotive Control: From Concept to Experiment to Product," Proceedings of the 1996 IEEE International Symposium on System Computer-Aided Control Design, pp. 129-134 (Sep. 1996).
Standards IEEE Industry and Technology Organization, The Nexus in 5001 Forum™ Debug Interface—Version 2.0, IEEE Nexus Forum (Dec. 23, 2003).

* cited by examiner

*Primary Examiner* — Mary Cheung
*Assistant Examiner* — Atul Trivedi
(74) *Attorney, Agent, or Firm* — Muncy, Geissler, Olds & Lowe, PLLC

(57) ABSTRACT

A method is provided for processing data in an influencing device, whereby the influencing device is connectable to a vehicle control unit and to a data processing unit. If the influencing device receives a first trigger or a second trigger, the first trigger is checked for a valid assignment to a function implemented in the hardware or software. If there is a valid assignment, the assigned function is started. A first address and/or a second address and/or the value are checked for a valid assignment to a first sub-function or a second sub-function. Depending on the called sub-function, the value is checked and/or manipulated and depending on the result of the check, the checked value and/or the manipulated value are sent by the influencing device to the vehicle control unit and/or to the data processing unit and/or stored in the memory of the influencing device.

11 Claims, 5 Drawing Sheets

METHOD FOR PROCESSING DATA IN AN INFLUENCING DEVICE

This nonprovisional application claims priority under 35 U.S.C. §119(a) to German Patent Application No. 10 2011 052 511.4, which was filed in Germany on Aug. 9, 2011, and which is herein incorporated by reference.

BACKGROUND OF THE INVENTION

1. Field of the Invention

The invention relates to a method for processing data.

2. Description of the Background Art

DE 102004027033 A1, which corresponds to US20080065239, which is incorporated herein by reference, discloses a method for processing data from a motor vehicle control unit 11 and a data processing unit 12 by an influencing device 10.

As shown in FIG. 4 and FIG. 5, a motor vehicle control unit 11 is connected to an influencing device 10, whereby motor vehicle control unit 11 and influencing device 10 are disposed together in a housing 20 or in two different housings. In this regard, motor vehicle control unit 11 and influencing device 10 are disposed in a motor vehicle either as shown in FIG. 5 or in a laboratory as shown in FIG. 4. A first program, for example, for controlling an engine, runs in vehicle control unit 11.

The task of influencing device 10 is, for example, to read out values from vehicle control unit 11 and to send them to a data processing unit 12, so that vehicle control unit 11 is tested in regard to its functions by data processing unit 12, or to provide vehicle control unit 11 with values from data processing unit 12 via an interface 19. A data processing unit 12 is, for example, a personal computer, a simulator, or a processor board.

Data are transmitted between vehicle control unit 11 and influencing device 10. DE 102006062555 A1 discloses a method for transmitting the data of a vehicle control unit 11 to an influencing device 10, the method in which influencing device 10 contains a first execution unit 14, a memory, and an interface, preferably a debug interface. With the interface, which has a so-called trace functionality, it is possible to monitor addresses to be monitored in memory 13 of a vehicle control unit 11, and to send the data to influencing device 10.

Influencing device 10 is connected to data processing unit 12. The data exchange between influencing device 10 and data processing unit 12 occurs according to the standardized XCP protocol and/or the CCP protocol.

As FIG. 6 shows, influencing device 10 serves as an interface between vehicle control unit 11 and data processing unit 12. In the state of the art, the data 16 sent from vehicle control unit 11 are sent by influencing device 10 unchanged according to the XCP protocol and/or the CCP protocol to data processing unit 12, or the data 17 sent from data processing unit 12 are sent unchanged by influencing device 10 to vehicle control unit 11. To this end, a second program 15, which controls the data transmission between vehicle control unit 11 and data processing unit 12, runs in a first execution unit 14 of influencing device 10, for example, a processor.

SUMMARY OF THE INVENTION

It is therefore an object of the invention to provide a method that refines the conventional art.

According to an embodiment of the invention, a method is provided for processing data (16, 17) in an influencing device 10, whereby influencing device 10 is connected to a vehicle control unit 11 and to a data processing unit 12. Vehicle control unit 11 and influencing device 10 are disposed in a motor vehicle or on a test bench or on a laboratory bench. A first program runs in vehicle control unit 11. Influencing device 10 contains a first execution unit 14, in which a second data processing process 15 runs implemented in the software or hardware. Data are exchanged according to an XCP protocol and/or a CCP protocol between data processing unit 12 and influencing device 10. If influencing device 10 receives a first trigger or a second trigger from vehicle control unit 11, from data processing unit 12, or from influencing device 10, the first trigger is checked for a valid assignment to a function implemented in the hardware or software. If there is a valid assignment, the assigned function is started. The function has at least one first address. A value is read out of a memory of influencing device 10 and/or a memory 13 of vehicle control unit 11 by means of the first address. Further, the function has a first sub-function and/or a second sub-function. The first address and/or a second address and/or the value are checked for a valid assignment to the first sub-function or the second sub-function. If there is a valid assignment, the assigned sub-function is called. Depending on the called sub-function, the value is checked and/or manipulated and depending on the result of the check, the checked value and/or the manipulated value are sent by influencing device 10 to vehicle control unit 11 and/or to data processing unit 12 and/or stored in memory 26 of influencing device 10.

An advantage of the method of the invention is that data or the values of the data are already processed in influencing device 10 and not sent unchanged by influencing device 10 as in the state of the art and processed only in the data processing unit 12 or vehicle control unit 11. As a result, the options for processing in real time, i.e., adherence to predetermined time intervals during data processing, are considerably improved.

In other embodiments, the checking of the assignment of the first address, a second address, or of the value to one of the two sub-functions during runtime, therefore after the start of the function, or also before the start of the function can be carried out in a configuration phase. For example, the configuration phase includes checking all functions and their addresses or values for their assignment to a first sub-function or a second sub-function after the start of the second program before the first function is started.

In an embodiment of the invention, the content of the first sub-function or the second sub-function is predetermined by means of a programming language and/or a modeling language before the start of the second program and/or before the start of the function. This means that a sub-function need not always be predetermined statically, but set in regard to its functionality as needed before the start of the second program or also as needed before the start of the function.

Based on this type of setting of the content, then in another run a program code is generated and/or an FPGA (Field Programmable Gate Array) is programmed and/or configured.

In another embodiment, a data format is set by means of the first sub-function or the second sub-function, for example, a data format in which the data are expanded by a check sum so that faulty data transmissions are detected. Next, data to be sent in this data format are sent by influencing device 10 to data processing unit 12 or to vehicle control unit 11. This results, for example, in the advantage that influencing device 10 is flexible for different data formats.

In another embodiment, the value, which is detected as faulty based on the execution of the first sub-function or the second sub-function, is not sent to data processing unit 12 and/or vehicle control unit 11. This has, for example, the advantage that a data transmission is saved and thus time is saved and that data processing unit 12 and/or vehicle control unit 11 do not work further with faulty values and to that end do not need to perform validity checks of the values.

In another embodiment, the second sub-function is also assigned to the first address and/or the second address and/or the value, in addition to the first sub-function, so that both sub-functions are executed.

In an embodiment of the invention, data sent by data processing unit 12 to influencing device 10 are stored in the memory of influencing device 10.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
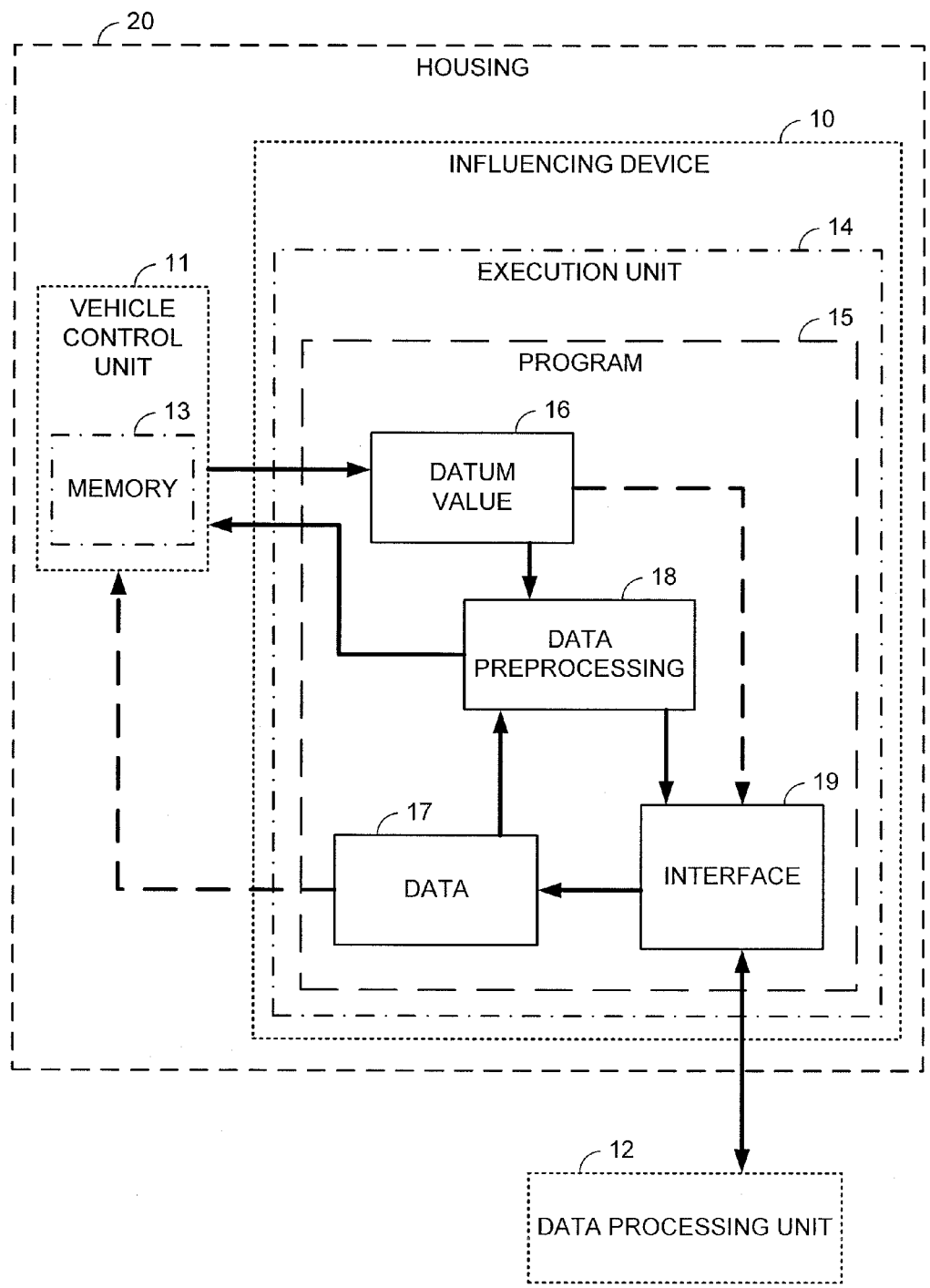
FIG. 1 shows a schematic view of the structural design of a vehicle control unit, an influencing device of the invention, and a data processing unit.

FIG. 1 shows a schematic view of the structural design of a vehicle control unit 11, an influencing device 10, and a data processing unit 12. Vehicle control unit 11 is connected to an influencing device 10, whereby vehicle control unit 11 and influencing device 10 are disposed together in a housing 20 or in two different housings.

Influencing device 10 is furthermore connected to a data processing unit 12 via an interface 19. A data processing unit 12 is, for example, a personal computer, a simulator, or a processor board. A data transmission between influencing device 10 and data processing unit 12 occurs according to the XCP protocol and/or CCP protocol.

Influencing device 10 contains an execution unit 14. Data are read from vehicle control unit 11 by means of the execution unit 14. A second program 15 runs in execution unit 14. For example, execution unit 14 receives the data via a trace interface of vehicle control unit 11 or reads the data out of a memory 13 of vehicle control unit 11 by means of second program 15. A value of a datum 16 sent from vehicle control unit 11 is not sent unchanged as in the state of the art by influencing device 10 according to the XCP protocol or the CCP protocol to data processing unit 12, but according to the invention checked and/or manipulated in execution unit 14 of influencing device 10. A data preprocessing 18 therefore occurs in execution unit 14, whereby execution unit 14 is either the same one that receives the data from vehicle control unit 11 or another execution unit 14 in influencing device 10.

Likewise, data 17, which influencing device 10 receives from data processing unit 12 according to the XCP protocol or CCP protocol, are preprocessed in execution unit 14 of influencing device 10 according to the invention by means of data preprocessing 18 before they are sent to vehicle control unit 11. For example, the values of the data sent by data processing unit 12 to influencing device 10 are checked and/or manipulated.

Figure 2:
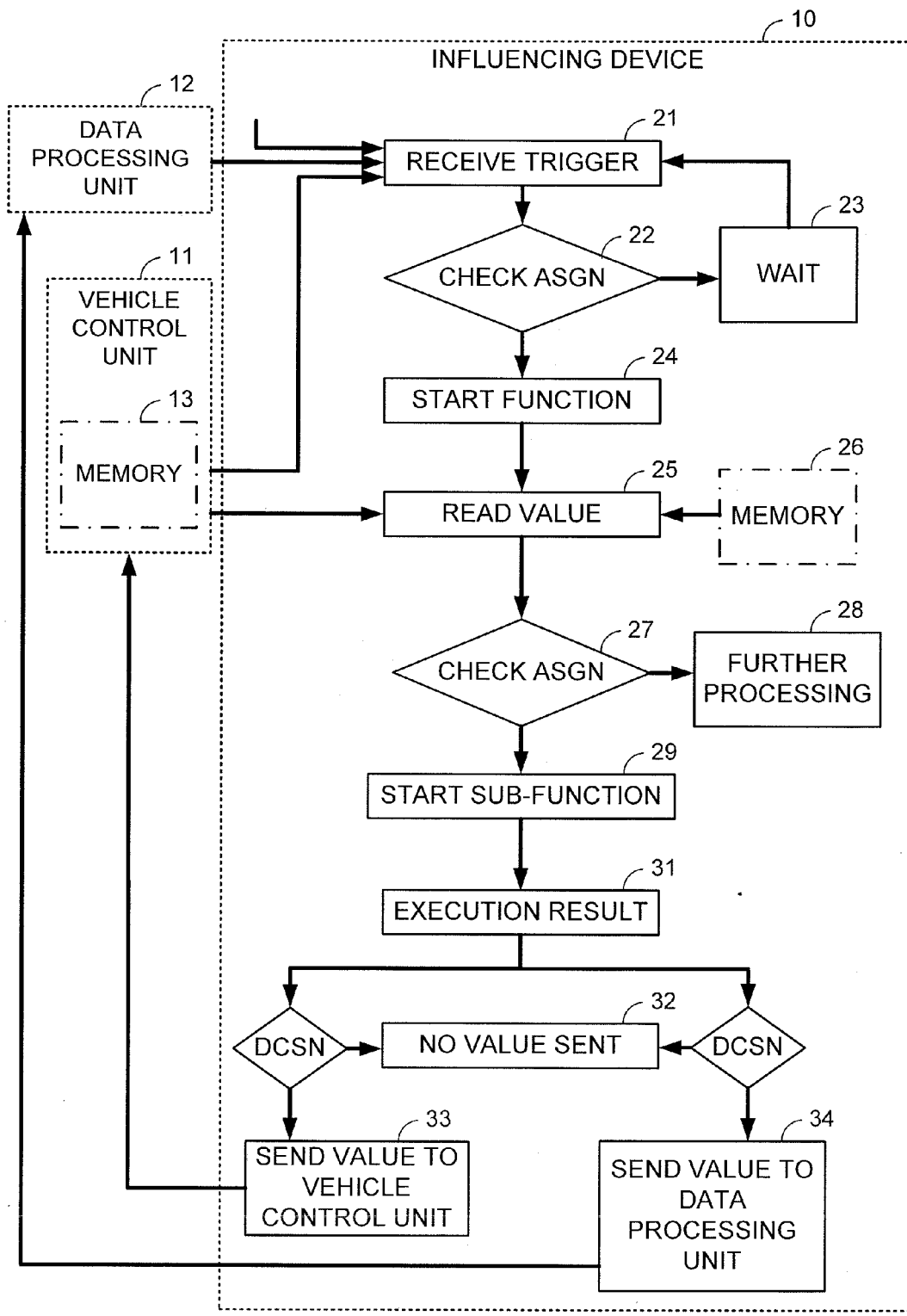
FIG. 2 shows a schematic view of a first embodiment of the invention of a method for the processing of data in an influencing device.
Figure 3:
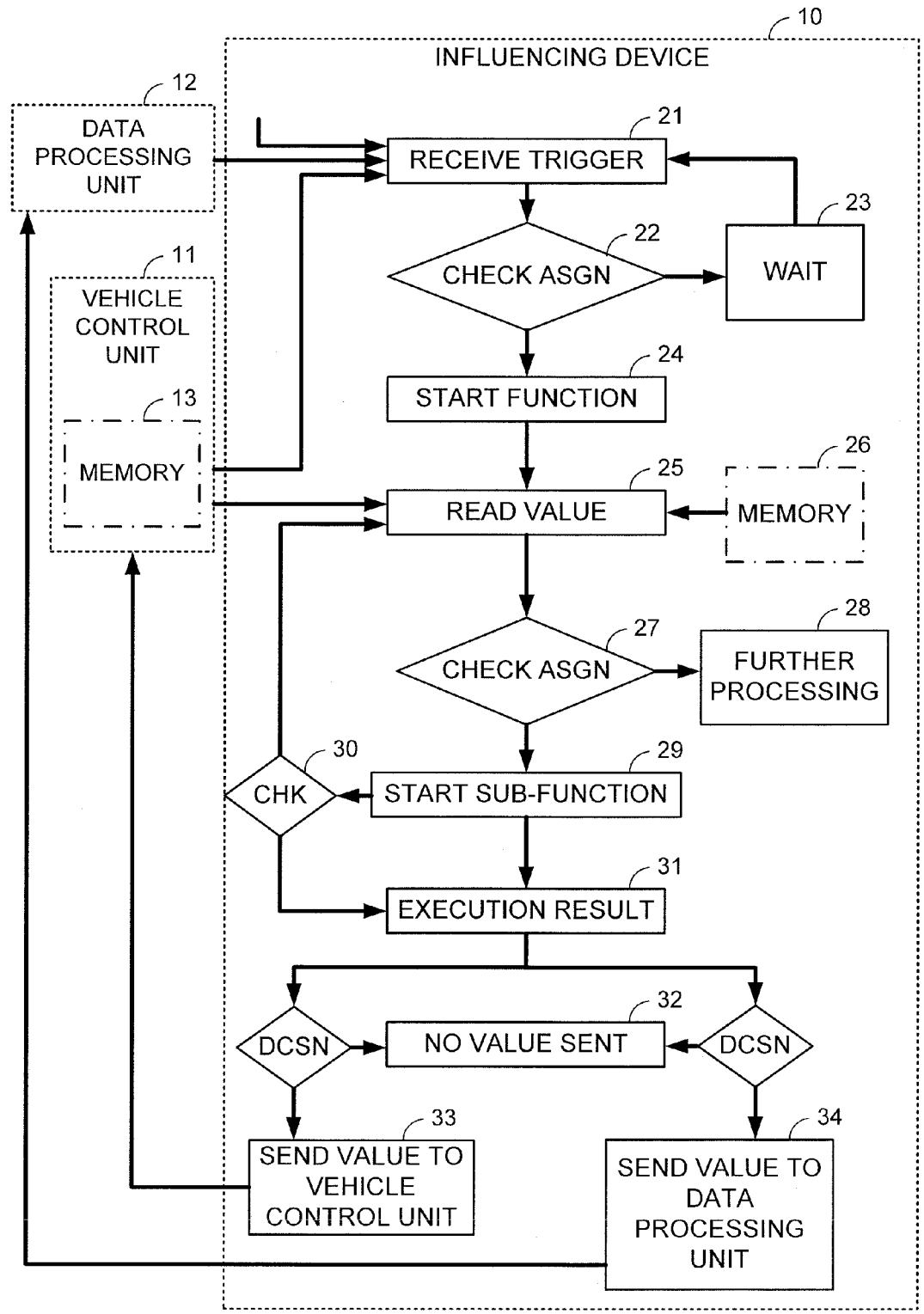
FIG. 3 shows a schematic view of another first embodiment of the invention of a method for the processing of data in an influencing device.
Figure 4:
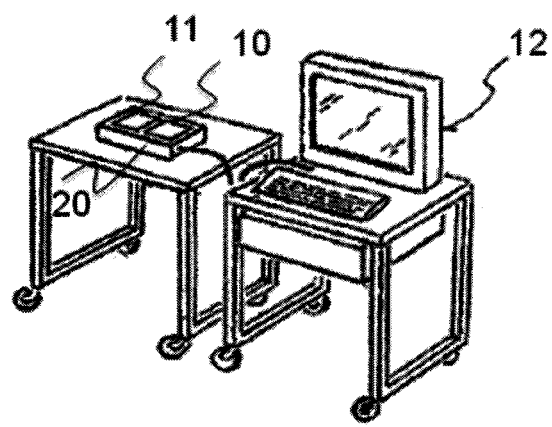
FIG. 4 shows a schematic view of the arrangement of a vehicle control unit and an influencing device in a laboratory according to the conventional art.
Figure 5:
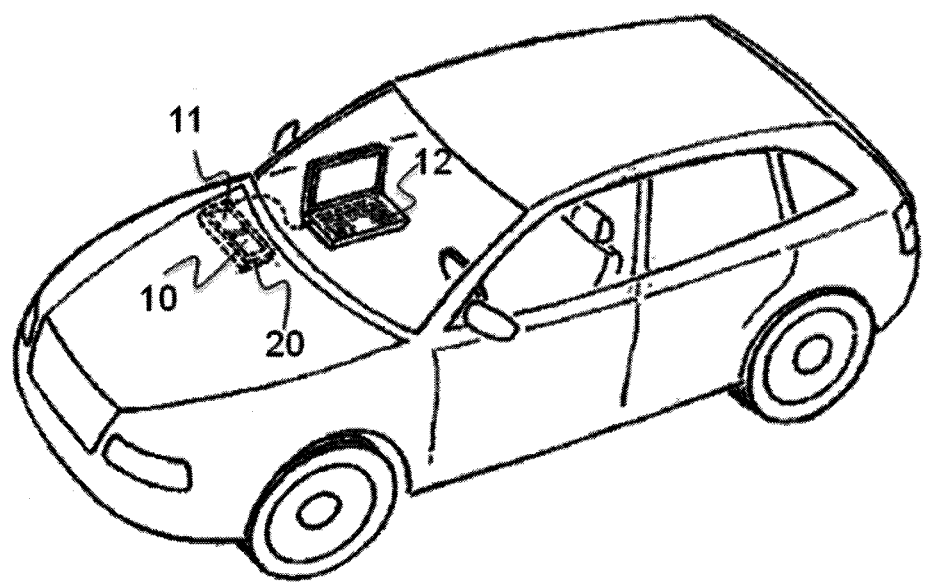
FIG. 5 shows a schematic view of the arrangement of a vehicle control unit and an influencing device in a motor vehicle according to the conventional art.
Figure 6:
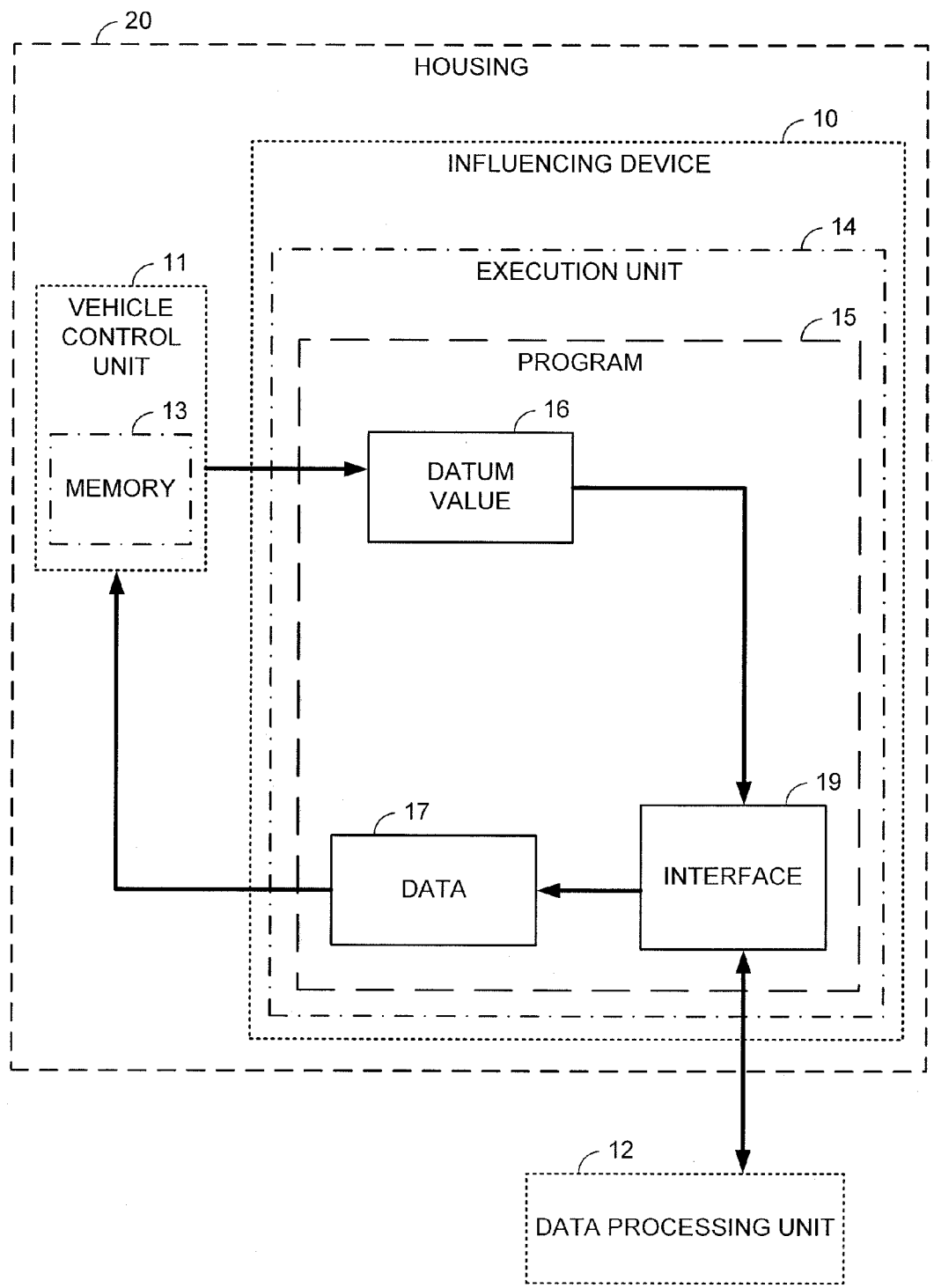
FIG. 6 shows a schematic view of the structural design of a vehicle control unit and an influencing device according to the conventional art.

FIG. 2 and FIG. 3 show a schematic view of embodiments according to the invention of a method for processing data in influencing device 10.

In a first process step 21, influencing device 10 receives a trigger from vehicle control unit 11, data processing unit 12, or influencing device 10 itself. A trigger of the influencing device 10 itself can be actuated, for example, by an established time.

The information whether data 16 sent from vehicle control unit 11 to data processing unit 12 are to be sent and/or whether data 17 sent from data processing unit 12 to vehicle control unit 11 are to be sent is linked to the trigger.

At the time of trigger there are implemented functions stored in a memory 26 of influencing device 10, whereby the functions are stored in the same memory region as the data in memory 26 or are stored in another memory region of memory 26. The functions are either stored separately or combined in a program. The already implemented function is accessed by execution unit 14 and controls, for example, the reading of data from vehicle control unit 11, the transmission of data from memory 13 of vehicle control unit 11 or memory 26 of influencing device 10 to data processing unit 12, or the transmission of data from memory 26 of influencing device 10 to vehicle control unit 11. Memory 26 of influencing device 10 contains, for example, data 16 from vehicle control unit 11, data 17 from data processing unit 12, or preset or configured data.

In a second process step 22, influencing device 10 checks whether there is a valid assignment of the trigger to a function. If there is no valid assignment of the trigger to a function, execution unit 14 in another process step 23 waits for the next trigger. If there is a valid assignment of the trigger to a function, this function is started in a process step 24.

Each function is assigned a first address in memory 26 of influencing device 10 or memory 13 of vehicle control unit 11. This assignment is implemented either fixedly in the function or occurs by means of the information contained in the trigger. Based on the first address, a value is read either from memory 13 of vehicle control unit 11 or from memory 26 of influencing device 10 in a process step 25. In another embodiment, for example, a value is stored in memory 26 of influencing device 10 by means of data processing unit 12 or the sub-function, for example, to selectively manipulate values in vehicle control unit 11.

In another exemplary embodiment, the function is assigned a second address in addition to the first address, from which the value was read. This assignment is implemented either fixedly in the function or occurs by means of the information contained in the trigger.

Further, according to the invention the function has a first sub-function and/or a second sub-function.

The first sub-function and/or the second sub-function are assigned to the first address and/or a second address and/or the value. In another process step 27 of the invention, the first address and/or the second address and/or the value are checked for a valid assignment to the first sub-function and/or the second sub-function. If there is no valid assignment to the first sub-function or the second sub-function, the function is processed further in process step 28. If there is a valid assignment, the assigned first sub-function and/or the assigned second sub-function are started in a process step 29 and processed in a process step 31.

Depending on the result of the execution 31 of the sub-function, a value is sent from influencing device 10 in a process step 33 to vehicle control unit 11, and/or in a process step 34 to data processing unit 12 or also no value is sent 32. For example, if in a sub-function a value is checked for error, only valid values are sent to vehicle control unit 11 or to data processing unit 12, for example. Faulty values such as, for example, a value outside an expected value range are either not sent or manipulated, so that the faulty value is replaced, for example, by a value within the expected value range.

In another embodiment, which is not shown, depending on the result of execution 31 of the sub-function, a value is stored by influencing device 10 in memory 26 of the influencing device and used, for example, in subsequent function calls. The storing of the value in memory 26 occurs either instead of or in addition to the transmission to vehicle control unit 11 and/or to data processing unit 12.

In another embodiment, a value is manipulated by means of the sub-function and the manipulated value is sent by influencing device 10 to vehicle control unit 11 and/or to data processing unit 12. A manipulation of the value is, for example, a calculation based on the value, for example, the conversion of the value to a value of another unit of measurement or also the replacement of the value by another predetermined or calculated value.

Another embodiment, shown in FIG. 3, includes performing a check in a process step 30, after sub-function 29 is started, whether another value is to be read from memory 13 of vehicle control unit 11 or from memory 26 of influencing device 10. The additional value is read in process step 25 and the address, from which the additional value is read, and/or the additional value is again checked for a valid assignment to the first sub-function and/or second sub-function in process step 27, and in the case of a valid assignment the assigned sub-function is started in process step 29.

In another embodiment, the first sub-function has a first priority and the second sub-function a second priority. If the second sub-function is called up, the execution of the first sub-function is interrupted if the second priority is higher than the first priority.

In a refinement of the invention, the content of the first sub-function or the second sub-function is predetermined by means of a programming language, for example, Java, C, C+, or C++, and/or a modeling language, for example, MAT-LAB®/SIMULINK®, before the start of the second program and/or before the start of the function. This means that a sub-function need not always be predetermined statically, but set in regard to its functionality as needed before the start of the second program or also as needed before the start of the function.

Based on such a determination of the content, in another execution, a program code, for example, an assembler code is then generated and/or an FPGA (Field Programmable Gate Array) is programmed and/or configured.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for processing data, the method comprising:
providing a vehicle control unit, an influencing device connectable to the vehicle control unit, and a data processing unit connectable to the influencing device, the influencing device comprising a first execution unit, the vehicle control unit and the influencing device being arranged in a motor vehicle or the vehicle control unit and the influencing device being arranged on a test bench or laboratory bench;
running a first program in the vehicle control unit;
running a second program that is implemented in software or hardware in the execution unit of the influencing device;
exchanging data according to an XCP protocol and/or a CCP protocol between the data processing unit and the influencing device;
receiving a first trigger or a second trigger from the vehicle control unit, from the data processing unit, or from the influencing device;
checking the first trigger for a valid assignment to a function implemented in the hardware or software; and
starting, by the influencing device, the assigned function if there is a valid assignment, the function having a first sub-function and/or a second sub-function, and the function having at least one first address;
reading out a value from a memory of the influencing device and/or a memory of the vehicle control unit via the first address;
checking the first address and/or a second address and/or the read value for a valid assignment to the first sub-function or the second sub-function, wherein, if there is a valid assignment, the assigned first sub-function and/or the assigned second sub-function is called up;
checking and/or manipulating the read value based on the called sub-function; and
sending, based on the result of the check, the checked value and/or the manipulated value via the influencing device to the vehicle control unit and/or to the data processing unit and/or storing the checked value and/or the manipulated value in the memory of the influencing device.

2. The method according to claim 1, wherein the checking of the assignment of the first address and/or a second address and/or of the value to the first sub-function or the second sub-function occurs after the function is started.

3. The method according to claim 1, wherein the checking of the assignment of the first address and/or the second address and/or of the value to the first sub-function or the second sub-function occurs before the function is started.

4. The method according to claim 1, wherein the content of the first sub-function and/or the second sub-function is predetermined by a programming language and/or a modeling language before the start of the second program and/or before the start of the function.

5. The method according to claim 4, wherein a program code is generated and/or an FPGA (field-programmable gate array) is programmed and/or is configured from the predetermined content.

6. The method according to claim 1, wherein a data format is set by the first sub-function or the second sub-function.

7. The method according to claim 1, wherein the value, which is detected as faulty based on the execution of the first sub-function, is not sent to the data processing unit and/or the vehicle control unit and/or stored in the memory of the influencing device.

8. The method according to claim 1, wherein the data processing unit sends data to the influencing device and these data are stored in the memory of the influencing device.

9. The method according to claim 1, wherein the first trigger or the second trigger is received by the influencing device.

10. The method according to claim 1, wherein the checking and/or manipulating of the read value is performed by the influencing device prior to the sending or storing of the checked value and/or the manipulated value by the influencing device.

11. An influencing device for processing data as an interface between a vehicle control unit running a first program and a data processing unit testing functions of the vehicle control unit, the influencing device comprising:
- an execution unit configured to run a second program implemented in software or hardware and to manage an exchange of data with the data processing unit according to an XCP protocol and/or a CCP protocol;
- memory coupled to the execution unit and configured to store instructions for causing the execution unit to:
  - check a received trigger for a valid assignment to a function of the second program,
  - start the assigned function if there is a valid assignment, the function having a sub-function and an address,
  - read out a value from memory according to the address,
  - check the address and/or the read value for a valid assignment to the sub-function,
  - call the assigned sub-function if there is a valid assignment,
  - check and/or manipulate the read value based on the called sub-function; and
- an interface configured to send the checked value and/or the manipulated value to the data processing unit according to the XCP protocol and/or the CCP protocol.

* * * * *